(No Model.)  2 Sheets—Sheet 1.

F. K. BETTS.
CAMERA SHUTTER.

No. 361,856.  Patented Apr. 26, 1887.

WITNESSES:
John H. Beemer
C. Sedgwick

INVENTOR:
F. K. Betts
BY Munn & Co
ATTORNEYS.

(No Model.) 2 Sheets—Sheet 2.

F. K. BETTS.
CAMERA SHUTTER.

No. 361,856. Patented Apr. 26, 1887.

WITNESSES:

INVENTOR:
F. K. Betts
BY Munn & Co.
ATTORNEYS.

UNITED STATES PATENT OFFICE.

FRED K. BETTS, OF NEW YORK, N. Y.

CAMERA-SHUTTER.

SPECIFICATION forming part of Letters Patent No. 361,856, dated April 26, 1887.

Application filed February 3, 1887. Serial No. 226,473. (No model.)

*To all whom it may concern:*

Be it known that I, FRED K. BETTS, of the city, county, and State of New York, have invented a new and Improved Camera-Shutter, of which the following is a full, clear, and exact description.

My invention relates to a spring-actuated camera-shutter for instantaneous exposure; and the invention consists, principally, in attaching to the slide two springs arranged to act in opposition to each other, one for opening, the other for closing, the exposing-aperture.

The invention also consists of the special construction, arrangement, and combination of parts, all as hereinafter described and claimed.

Reference is to be had to the accompanying drawings, forming a part of this specification, in which similar letters of reference indicate corresponding parts in all the figures.

Figure 1:
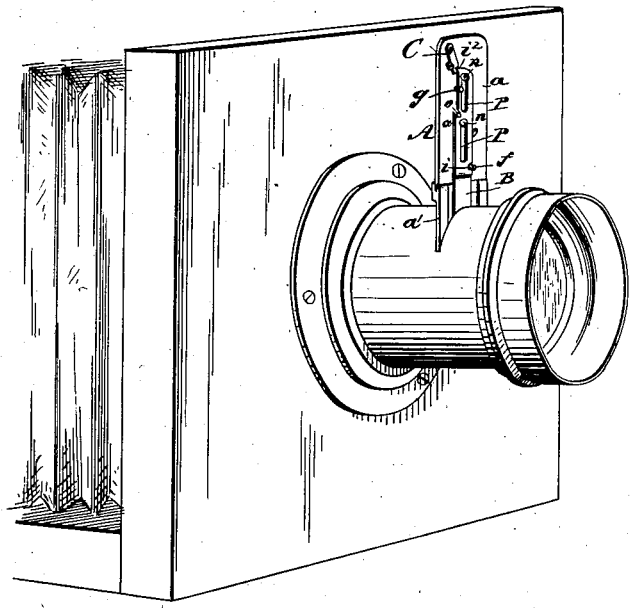
Figure 2:
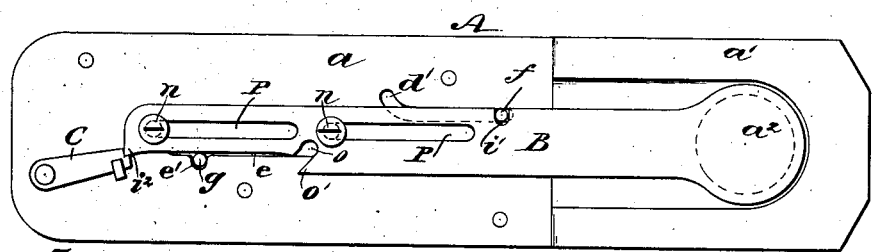
Figure 3:
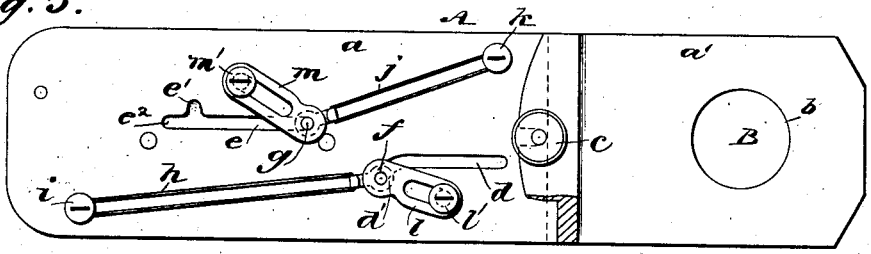
Figure 4:
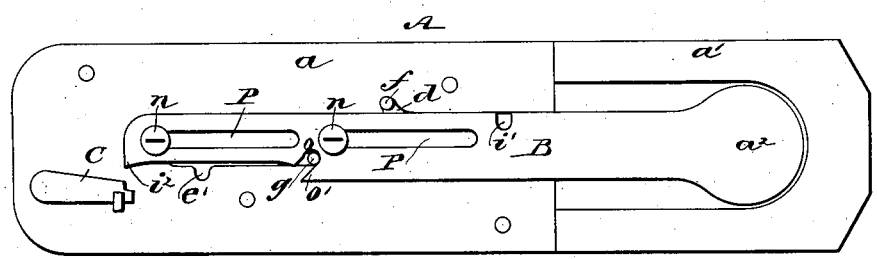

Figure 1 is a perspective view of a camera having my new shutter applied thereto. Fig. 2 is an enlarged view of the front of the shutter, showing the parts in position ready for exposure. Fig. 3 is a back view of the shutter, showing the position of the parts just after exposure; and Fig. 4 is a front view of the same.

A represents the main plate of the shutter, composed, by preference, of the two sections $a$ and $a'$, the former carrying the slide B, the latter formed with the exposing-aperture $b$ normally closed by the plate B. There will be several of the sections $a'$ with apertures of different sizes, so that the proper exposure may be effected in any light by selecting the section of proper aperture and attaching it to section $a$ by a set-screw, $c$, or by other means.

The section $a$ has formed in it the two slots $d$ $e$, in which the pins $f$ $g$ work. The slot $d$ is curved at one end, as shown at $d'$, to form a clearance or detent for the pin $f$, so that said pin may be switched out of line with the slide B. The slot $e$ is formed with the notch $e'$ to receive the pin $g$, to carry it out of line with the adjacent edge of the slide, and the slot $e$ is extended somewhat past the notch $e'$, as shown at $e^2$, to permit the pin $g$ to pass the notch a short distance, as hereinafter described.

To the pin $f$ there is attached the spring $h$, held at its opposite end by the stud $i$, secured near the outer end of the section $a$, while to the pin $g$ is attached one end of the spring $j$, the opposite end of which is secured to the stud $k$, secured near the inner end of the section $a$, so that the springs $h$ $j$ act in opposition to each other, or in opposite directions on slide B. To prevent the possible binding of the pins $f$ $g$ in their respective slots, I prefer to attach them to the plates $l$ $m$, respectively, which plates are slotted and slide freely upon the studs or screws $l'$ $m'$, which hold the said plates to the back of the section $a$.

The slide B is held to the face of the section $a$ by the studs or screws $n$ $n$, passed through slots P P, made in the slide, and screwed into the section $a$. The enlarged portion $a^2$ of the slide closes the aperture $b$, and in one edge of the slide is formed the notch $i'$, into which the pin $f$ may enter when the slide is moved back to bring the notch $i$ in line with the curved extension $d'$. In this manner the pin $f$ may be moved into the main slot $d$ and shoved forward in said slot $d$, carrying the slide B forward to position to close the aperture $b$ and at the same time put a tension upon the spring $h$, ready to withdraw the slide from over the opening $b$ the instant the lock or dog C is turned out of engagement with the point or lip $i^2$ of the slide. The spring $j$ normally holds the slide B closed over the opening $b$; but an additional tension is put upon this spring when the slide B is shoved back to put said pin in the notch $e'$. The said pin $g$, when not in the notch $e'$ of the section $a$, is in the notch $o$ of the slide B, in which position the tension of the spring $j$ is exerted upon the slide to close it over the aperture $b$; and for automatically sliding the pin $g$ from notch $e'$ into the notch $o$, I form an inclined projection or cam, $o'$, at the edge of the slide, which, when the slide is thrown open by the spring $h$, strikes the pin $g$ in notch $e'$ and forces it out of said notch into the notch $o$, so that the spring $j$ will instantly close the slide.

In use, the parts being in the position shown in Figs. 3 and 4—that is, the slide B being held closed by the spring $j$ and the pin $f$ in the curved part $d'$ of groove $d$—the slide will be moved back to uncover the opening $b$. This will put additional tension upon the spring $j$ and will bring notch $i'$ in line with the pin $f$ in curve $d'$, and also will move pin $g$ into the extension $e^2$ of the slot $e$. The pin $f$ will now be moved from the curve $d'$ of slot $d$ into the notch $i'$, which connects the spring $h$ directly with the slide, and at the same time the pin $g$ will be moved from notch $o$ into the notch $e'$, which disconnects spring $j$ from the slide, but maintains the tension of the spring. The slide at this time will be shoved to a closed position (moving pin $f$ along slot $d$, increasing the tension of spring $h$) until it fully closes the opening $b$, when it will be locked by the dog C. The parts being in this position, upon the turning the dog C out of engagement with the slide the spring $h$ will instantly throw the slide open and shift the pin out of the notch $i'$ into the curved end $d'$ of slot $d$. Just before the pin $f$ enters the curved slot $d'$ the cam $o'$ will strike the pin $g$ and shift it from the notch $e'$ into the notch $o$ of the slide, whereupon the spring $j$ will instantly close the slide, thus giving an instantaneous exposure.

Having thus fully described my invention, I claim as new and desire to secure by Letters Patent—

1. A camera-shutter comprising an apertured plate, a slide for closing the aperture of said plate, two springs arranged to act alternately and in opposite directions upon the slide, one for opening, and the other for closing it, a locking device for the slide, and suitable switch-notches for disconnecting the springs from the slide, the latter being formed to automatically throw out of action the opening-spring and in action the closing-spring, substantially as described.

2. In a camera-shutter, the slide B, notched to receive the pin $f$, to which the opening-spring is attached, and notched, also, to receive the pin $g$, to which the closing-spring is attached, in combination with the main plate formed with the curved slot $d$ and slot $e$, having the side passage, $e'$, substantially as described.

3. In a camera-shutter, the slide B, formed with the notches $i'$ and $o$, and formed with the projection or cam $o'$, substantially as and for the purposes set forth.

4. In a camera-shutter, the main plate having a curved slot, $d$, and notched slot $e$, and the slide B, having notches $i'$ $o$, and formed with the cam $o'$, in combination with the pins $f$ $g$ and springs $h$ $j$, arranged to operate in opposition to each other upon the plate B, substantially as described.

5. The guides $l$ $m$, connected to studs $l'$ $m'$ and carrying the pins $f$ $g$, working in slots of the main plate, in combination with the springs $h$ $j$ and the slide B, substantially as shown and described.

FRED K. BETTS.

Witnesses:
H. A. WEST,
E. M. CLARK.